3,671,115

AUDIO-VIDEO SYSTEM EMPLOYING SOUND TRACK TAPE BELTS MOVABLY MOUNTED ON PROJECTION SLIDES

Sam Larkin, 254 Beach 140th St., Belle Harbor, N.Y. 10013

Filed Jan. 30, 1970, Ser. No. 7,052
Int. Cl. G03b *21/64, 31/04*
U.S. Cl. 353—19 12 Claims

ABSTRACT OF THE DISCLOSURE

The system shown includes a slide projector with a slide changer, and a magnetic tape record associated with electronic apparatus akin to a tap recorder including a magnetic pick-up head, all dealing with projection slides on which the tape, an endless belt, is movably mounted. The belt, arranged in square formation around the transparency, is flattened so its four flights are parallel to the general plane of the slide; there being a 45 degree fold line in the belt across each corner where it is supported on edges on the slide body. The sound track is along a line once around one face of the belt with a conductive spot between start and finish. Opposite cut-outs in the slide expose both belt surfaces. The magnetic head is one jaw of a normally open clamp form while a powered friction drive wheel is the other jaw. The clamp is closed upon actuation of a solenoid, whereupon said magnetic head and rotating wheel enter the cut-outs to pinch the tape, thus causing it to move and its track played. Conductive spring fingers on the clamp arms also pinch the tape upon the closing of the clamp, and making contact with said spot, constitute a switch in a circuit including said solenoid and a locking relay device, operating automatically to cause the clamp to open when playing is done.

Figures 1, 2, 3, 5, 6, 7, 8:
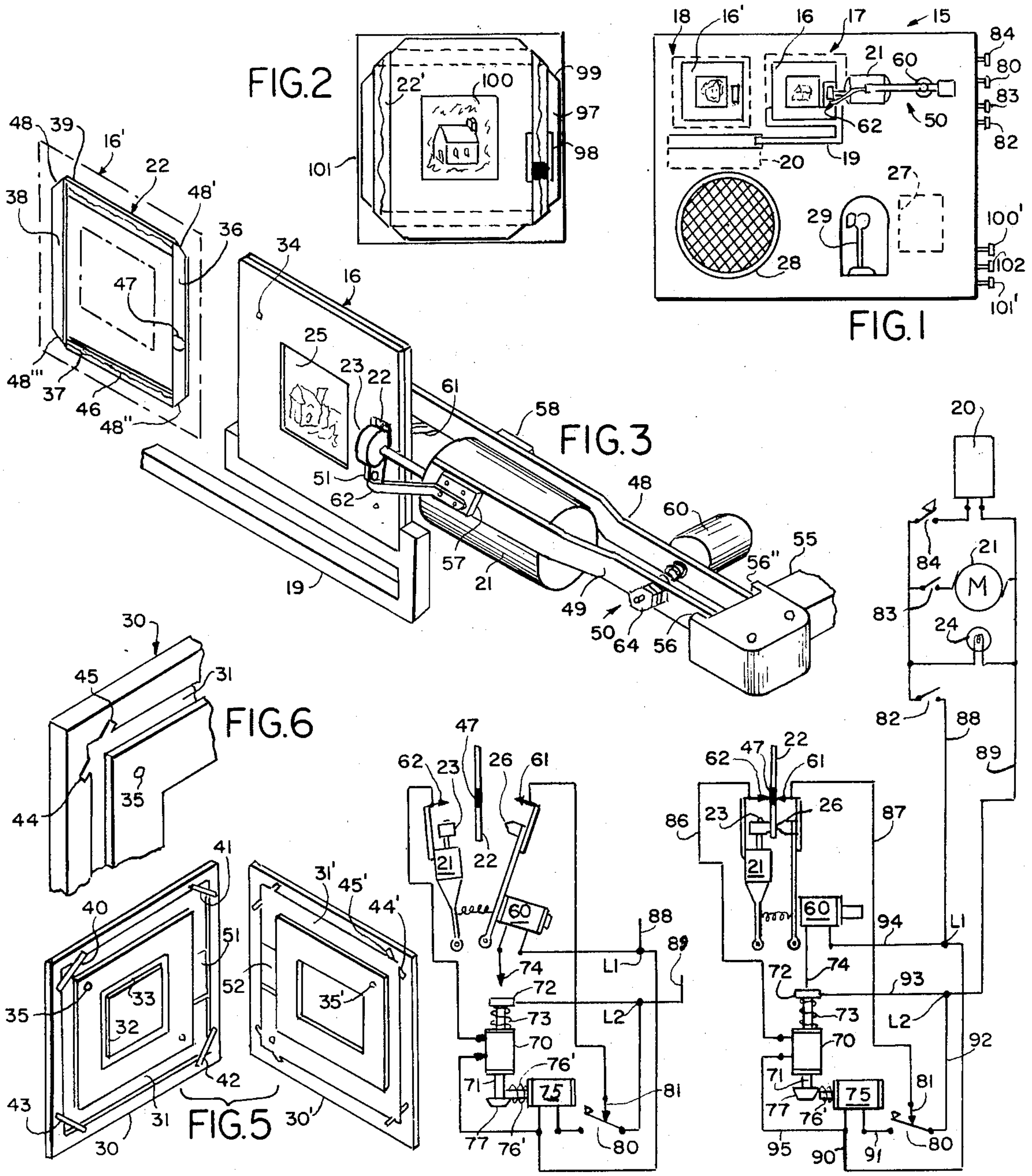
Figure 4:
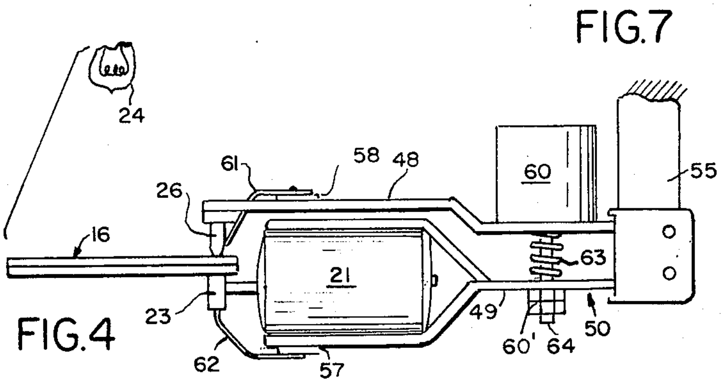

The present invention relates to a system for slide projection with sound production, and contemplates that a sound-track-carrying projection slide will be made to "talk" by electronic means during a time when its transparency is projected onto a screen, and therefor includes a slide projector and an electronic magnetic record sound apparatus to deal simultaneously with the slide. The slide may be placed by hand into projection position and removed therefrom, or a slide changer may be used for such purpose.

An object of this invention is to provide a novel and improved audio-visual system of the character mentioned, wherein the sound track is on an endless magnetic tape belt which is movably mounted on the slide; such belt being in a special formation so the slide is thin and said belt is easily mounted in a simple manner on the slide body. The said tape belt being separate, entails no problem which would be met if it were to be rigidly attached in a precise position on some moving member on the slide, which member would need be precisely mounted. My new scheme of slide construction affords economy in manufacture and proper operation.

A further object thereof is to provide a novel and improved audio-visual system of the character described, employing an endless magnetic tape having a sound track along a line thereon only once around. Sound apparatus is brought into action at the beginning of the record and then the tape belt is made to stop automatically when it has made one lap around. The projection of the transparency may of course be continued thereafter, as long as desired.

A further object thereof is to provide a system of the kind set forth, which will allow the projection of ordinary slides having no sound provision, without interference by or to the sound-producing means.

A further object thereof is to provide a novel and improved sound-track-carrying projection slide of the character set forth, which is a flat, thin composite, easily stackable and adaptable for use in slide changers following present design, which may be included in the system taught herein.

Still a further object of this invention is to provide a novel and improved audio-visual system employing sound-track-carrying projection slides in the manner set forth, which is reasonable in cost to manufacture, easy to operate and efficient in carrying out the purposes for which it is designed.

Other objects and advantages will become apparent as this disclosure proceeds.

For one practice of this invention, the system includes a slide projector with a slide changer, and magnetic record sound apparatus, akin to a tape recorder, including a magnetic head for recording, reproducing and erasing, all dealing with sound-track-carrying projection slides. The record is on a face of a pliable tape formed into an endless belt which is supported is a substantially square formation around a transparency. The belt is arranged so that its four flights are parallel to the general plane of the slide; there being a catercorner, 45 degree slant line fold across each corner of said belt, on which fold lines it is supported on edges presented on the slide body. Viewed from one face of the slide, one set of opposite belt flights present their sound track surfaces forwardly, while the other set of opposite flights present their sound track surfaces rearwardly. The belt, though taut, is loose enough to be moved along its length; the position of the fold lines occurring in the belt, always changing along the belt, but of course the presented edges supporting the belt on such fold lines for movement, remaining in fixed relation on the slide body. When the slide is placed into projection position, it is between the jaws of an open clamp structure which is spring-biased to open position. One clamp arm carries the magnetic head as its jaw, facing a flight of the magnetic tape belt. The other clamp arm carries a motor-driven drive wheel as its jaw. A solenoid associated with said arms, closes the clamp structure when actuated, so said belt flight is "pinched" by said mangetic head and drive wheel. When the motor is operated, the tape belt will be moved along its length on the slide body, and if the sound apparatus is active, the record will be played. The slide body has suitable cut-outs to allow the jaws to come to the tape flight. The sound track is but a single line once around the tape belt. At the start of the recording line, the tape belt which is non-conductive, has a conductive spot therethrough. Each clamp arm insulatively carries a springy contact finger; said fingers contacting the opposite surfaces of said conductive spot when the tape belt is in position on the slide body, whereat the start of the record would be contacted by the magnetic head when said solenoid is actuated. Said fingers constitute a switch when in conjunction with said spot. As the belt moves, said magnetic head, drive wheel and fingers continue in contact with the belt. A circuit including said switch and solenoid, and additional solenoid and relay means, employs another switch to initiate a cycle of operation, and the arrangement is such that when said springy fingers again contact said conductive spot on the tape belt, the clamp structure will open whereupon the tape movement and sound production will stop, and the apparatus is again in its normal rest condition, ready for a change of slide and repetition of the cycle of operation.

In the set-up of each slide, its tape belt should be so positioned thereon that the said conductive spot 47 shall June 20, 1972 S. LARKIN 3,671,115

AUDIO-VIDEO SYSTEM EMPLOYING SOUND TRACK TAPE BELTS MOVABLY MOUNTED ON PROJECTION SLIDES

Filed Jan. 30, 1970

INVENTOR,
Sam Larkin, by [signature]

ATTORNEY.

74 is connected by a conductor to the other terminal of said solenoid 60. The contact element 72 is connected by a conductor 93 to line L2.

Tracing the circuits, it is to be noted that the closing of the switch 80 will actuate the solenoid 75, because of the flow of current from the power terminal L1, and thence in sequence, through the conductor 90, said solenoid 75, the switch 80 and then through the conductor 92 to the power terminal L2. The actuation of said solenoid 75, will cause its armature 76 to be drawn into the solenoid coil, and thereupon release the armature 71 for movement to make contact with the contact point 74. Thereupon, the circuit of the solenoid 60 will be closed because of the flow of current from the power terminal L1, and then in sequence through the conductor 94, said solenoid 60, the contact point 74, the element 72 and thence to line L2. The actuation of the solenoid 60, will draw in its armature into its coil, thereby closing the clamp 50, whereupon the pick-up head 26 and the power-driven wheel 23, will pinch the tape 22 and cause it to move on the slide, and its record will be played because the pick-up head is in contact with the record along line 46. Although at start, the contact fingers 61 and 62 will contact the conductive spot or section 47 of the tape 22, the closing of the switch 80 will have caused its blade to move away from the contact point 81, and so any circuit controlled by the closed switch constituting the elements 61, 47, 62, would be open. However, since the switch 80 is let go soon after the tape has moved so its conductive spot 47 is away from said fingers, it is evident that upon belt movement of once around, said fingers will again contact the conductive spot 47, and being that the switch 80 is in open condition, there will be a flow of current from power terminal L1, and thence in sequence through the conductor 90, the conductor 95, the solenoid 70, the conductor 86, the elements 62, 47, 61, then through the conductor 87 to contact point 81, then through the blade of the switch 80 and thence to the power terminal L2. The solenoid 70 being thus energized, will cause the drawing in of its armature 71, and the head 77 will cam the armature 76 to lie atop of it as in FIG. 7. The drawing in of the armature 71, will open the contact of the elements 72 and 74, hence the solenoid 60 will be deenergized and so the clamp 50 will open, and the condition of the system will be as shown in FIG. 7, which is rest condition. The projection of the transparency 25 will continue without sound. Now to change the slide, the switch 24 is momentarily closed so the transporter 19 of the slide changer 18, will be reciprocated whereupon as is known in usual changer functioning, the slide 16 will be deposited in the rack which is the storage component of the slide changer, and the next slide 16′ will be brought into projection position on the projector 17. Now to play the sound track of the new slide 16′, all that is necessary is to press the switch 84 to close and then let it open after the tape is moved so that its condutcive spot is away from the contact fingers 61, 62. Of course, during the time the system is to be used, the motor 21 is continuously running. It is evident that the cycle will automatically repeat itself and the sound will stop when said spot on the tape belt on the slide 16′ is again in contact with said fingers.

So to operate the system, the switch 82 is closed, and so is the switch 83 so the motor 21 is actuated and let run the whole time the system is to be in use. To work the system without sound, meaning for projection alone, the switch 83 is opened.

So to operate the system with sound, the switches 82 and 83 are closed. The electrical tape recorder apparatus is set for play-back by closing its switch 100′ therefor provided. (The numeral 101′ indicates the switch to set the tape recorder apparatus for recording, and the switch 102 is to set same for erasing, when such operations are desired.) And to manipulate the slides, first the switch 84 is momentarily closed, and then, the sound operating switch 80 is momentarily closed. After each cycle of sound play, a new cycle is initiated by the operation of said two switches in the sequence mentioned.

If the system is to be without the automatic slide changer, the switch 84 and the mechanism 18 which includes the components 20 and 19 are of course absent. In the event the automatic stopping feature is to be omitted, the record tape needs no conductive spot, and instead of fingers 61 and 62, their connections are made to an accessible normally open switch therefor provided to be manually operated, whose closing will effect the opening of the circuit of the solenoid 60, which is believed understood without the necessity of further illustration.

Another form of slide construction is shown in FIG. 2, where the slide body piece offering a frame for the transparency, is of square form as 97, with chamfered corners to present the supporting edges as 99 for carrying the tape belt 22′; the numeral 98 being a cut-out to expose the tape surfaces. Shallow channels, not known, but akin to 31, are provided on the surfaces of said piece 97 which is flat, and may have two square facing flat pieces of thin material, cemented on at points between the belt 22′ and the central transparency 100, to give the composite slide so provided, a square periphery. One such piece is shown on the back surface of the mount 97, and is indicated by the numeral 101. The facing piece which is on the front of said mount being omitted to attain clarity of illustration.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific showings adn description herein, to indicate the scope of this invention.

I claim:

1. In combination with a slide projector having means for supporting a projection slide in an operative projection position, and magnetic sound apparatus having a magnetic head for operative association with a sound track on a magnetic record, the improvement comprising a projection slide, said projection slide carrying a projection transparency, a magnetic record extending as an endless pliable belt mounted on said projection slide for displacement relative to the latter, said belt including a sound track extending generally lengthwise as long at least one surface thereof, a pair of arms swingably mounted proximate the operative projection position of said projection slide for movement toward and away from one another into and out of contact with opposite surfaces of said belt respectively, one of said arms including said magnetic head for contacting one surface of said belt and responding to the sound track on the latter surface, the other of said arms including a power-driven wheel for contacting the opposite surface of said belt and frictionally driving said belt relative to said projection slide, and control means for moving said pair of arms into and out of operative association with said belt when said projection slide is in said operative projection position.

2. A combination, as defined in claim 1, wherein said control means includes means for biasing said arms away from said belt into an at-rest position, solenoid means for moving said arms into contact with said belt, and circuit means including switching means for controlling said solenoid means.

3. A combination as defined in claim 1, wherein said arms are arranged opposite each other as a clamp structure, and said magnetic head is directly opposite the drive wheel; said head and wheel having a flight of said belt between them, whereby on closing said clamp upon actuation of said solenoid, said belt flight will be pinched by said head and wheel.

4. A combination as defined in claim 1, wherein said belt is a tape arranged in a rectangular formation so it has four flights; said belt being flattened whereby its flights are parallel to the general plane of the slide; one set of opposite flights presenting the sound track line portions thereon towards one face of the slide, and the other set of opposite flights presenting the sound track portions thereon towards the other face of the slide; said belt having a catercorner fold line at each of its corners, and the body of the slide presenting four edges whereon said tape is supported at said fold lines respectively.

5. A combination as defined in claim 4, wherein the said fold-line-supporting edges are across the corners of the body of the slide; said corners being chamfered to provide said supporting edges.

6. A combination as defined in claim 4, wherein said fold-line-supporting edges are offered by four pins whose ends are supported on the slide body; there being space around the intermediate portions of said pins and between said portions of successive pins to provide clearance for the belt and to allow its movement on the slide body.

7. A combination as defined in claim 1, wherein the belt surrounds the transparency.

8. A combination as defined in claim 7, wherein the belt is arranged in a substantially square formation.

9. A combination as defined in claim 1, wherein the magnetic sound apparatus includes means for recording and playback.

10. A combination as defined in claim 9, wherein the magnetic sound apparatus includes means for erasing the recording.

11. A combination as defined in claim 1, wherein the belt is non-conductive and includes a conductive spot between the start and finish of the sound track line, and including two conductive elements carried on the arm structure, adapted to contact said conductive spot when the slide is set into projection position; the belt being so positioned on the slide body that the spot is in position to effect such contact; said conductive elements and spot constituting a first switch included in said switching means; the remainder of said switching means being adapted for actuating said solenoid, and said first switch automatically deactuating said solenoid only when said contact is reestablished at the end of one turn of said belt.

12. The combination as defined in claim 11, wherein the remainder of the switching means of the circuit consists of a locking relay device comprising a second solenoid having a second armature and a second switch; said second switch being biased to closed condition by the second armature while the second solenoid is inactive and adapted to be brought automatically into open condition upon actuation of the second solenoid, a third solenoid having a third armature which is biased to bear against the second armature and hold it against return movement when the second solenoid is actuated whereupon the second switch is held in in open condition; said second armature being released from the hold of the third armature upon actuation of the third solenoid; there being cooperative releasable engagement means on said second and third armatures to effect such hold, and a third switch comprising a blade and first and second contact points; said blade being movable from one of its associated contact points to the other; said blade being biased to normally contact the first contact point and a source of electrical energy to power the circuit; one of the power terminals being connected to one terminal of each of the solenoids; the second power terminal being connected to said blade of the third switch and to one terminal of the second switch; the other terminal of the second switch being connected to the other terminal of the first solenoid; the other terminal of the second solenoid being connected to one of the contact elements of the first switch; the other contact element of the first switch being connected to the first contact point of the third switch, and the other terminal of the third solenoid being connected to the second contact point of the third switch.

References Cited

UNITED STATES PATENTS

| | | | |
|---|---|---|---|
| 3,578,858 | 5/1971 | Lemarr | 353—120 |
| 3,238,842 | 3/1966 | Wiklund et al. | 353—120 |
| 3,296,925 | 1/1967 | Yamamoto | 353—120 |

HARRY N. HAROIAN, Primary Examiner

U.S. Cl. X.R.

274—4 D; 353—120